(12) United States Patent
Sanfilippo et al.

(10) Patent No.: US 12,446,332 B2
(45) Date of Patent: Oct. 14, 2025

(54) OPTO-ELECTRONIC DEVICE FOR DETECTING AND LOCALIZING OBJECTS FOR LIDAR APPLICATIONS

(71) Applicant: STMICROELECTRONICS S.R.L., Agrate Brianza (IT)

(72) Inventors: Delfo Nunziato Sanfilippo, Catania (IT); Piero Fallica, Catania (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 598 days.

(21) Appl. No.: 17/821,711

(22) Filed: Aug. 23, 2022

(65) Prior Publication Data

US 2023/0062980 A1   Mar. 2, 2023

(30) Foreign Application Priority Data

Aug. 30, 2021   (IT) .......................... 102021000022547

(51) Int. Cl.
  *H10F 30/225*   (2025.01)
  *G01S 7/4863*   (2020.01)
  (Continued)

(52) U.S. Cl.
  CPC .......... *H10F 30/225* (2025.01); *G01S 7/4863* (2013.01); *H10F 71/121* (2025.01); *H10F 77/148* (2025.01)

(58) Field of Classification Search
  CPC .... H10F 30/225; H10F 71/121; H10F 77/148; G01S 7/4863
  See application file for complete search history.

(56) References Cited

U.S. PATENT DOCUMENTS

| | | | |
|---|---|---|---|
| 2006/0098365 A1* | 5/2006 | Harris | H02H 9/025 257/E27.033 |
| 2013/0153962 A1* | 6/2013 | Sim | H10F 30/225 257/E31.064 |
| 2019/0198701 A1* | 6/2019 | Moussy | H10F 77/1642 |

FOREIGN PATENT DOCUMENTS

| | | | | |
|---|---|---|---|---|
| CN | 105931952 A | * | 9/2016 | ........... H01L 21/265 |
| CN | 105633128 B | | 5/2019 | |

(Continued)

OTHER PUBLICATIONS

Lee et al., "High-Performance Back-Illuminated Three-Dimensional Stacked Single-Photon Avalanche Diode Implemented in 45-nm CMOS Technology," *IEEE Journal of Selected Topics in Quantum Electronics*, 24(6):3801809, Nov./Dec. 2018. (9 pages).

(Continued)

*Primary Examiner* — Sitaramarao S Yechuri
(74) *Attorney, Agent, or Firm* — Seed Intellectual Property Law Group LLP (57) ABSTRACT

The present disclosure is directed to an opto-electronic device of semiconductor material formed in a semiconductor layer of a first conductivity type having a thickness and accommodating at least one deep region of a second conductivity type. The deep region forms a PN junction with the semiconductor layer. The deep region has a depth greater than the width. The deep region is formed by a bottom portion contiguous to a first layer portion of the semiconductor layer; a surface portion contiguous to a second layer portion of the semiconductor layer; and an intermediate portion contiguous to a third layer portion. The concentration of the third layer portion is greater than that of the first and second layer portions.

16 Claims, 8 Drawing Sheets

(51) Int. Cl.
*H10F 71/00* (2025.01)
*H10F 77/14* (2025.01)

(56) References Cited

FOREIGN PATENT DOCUMENTS

| | | |
|---|---|---|
| CN | 105931952 B | 6/2019 |
| CN | 110212044 A | 9/2019 |
| EP | 1152458 A1 | 11/2001 |
| EP | 2747154 A1 | 6/2014 |
| EP | 2779255 A1 | 9/2014 |

OTHER PUBLICATIONS

Lee et al., "First Near-Ultraviolet- and Blue-Enhanced Backside-Illuminated Single-Photon Avalanche Diode Based on Standard SOI CMOS Technology," *IEEE Journal of Selected Topics in Quantum Electronics*, 25(5):3800206, Sep./Oct. 2019. (6 pages).

\* cited by examiner

OPTO-ELECTRONIC DEVICE FOR DETECTING AND LOCALIZING OBJECTS FOR LIDAR APPLICATIONS

BACKGROUND

Technical Field

The present disclosure relates to an opto-electronic device for detecting and localizing objects for LIDAR applications.

Description of the Related Art

As known, LIDAR (LIght Detection And Ranging or Laser Imaging Detection And Ranging) systems are increasingly used, possibly in combination with video cameras and radar systems, for environmental mapping and for other safety applications, such as emergency braking, pedestrian detection and collision avoidance in the automotive sector, thanks to their 3D detection capability and the ability to operate in darkness and in unfavorable weather conditions.

Figure 1:
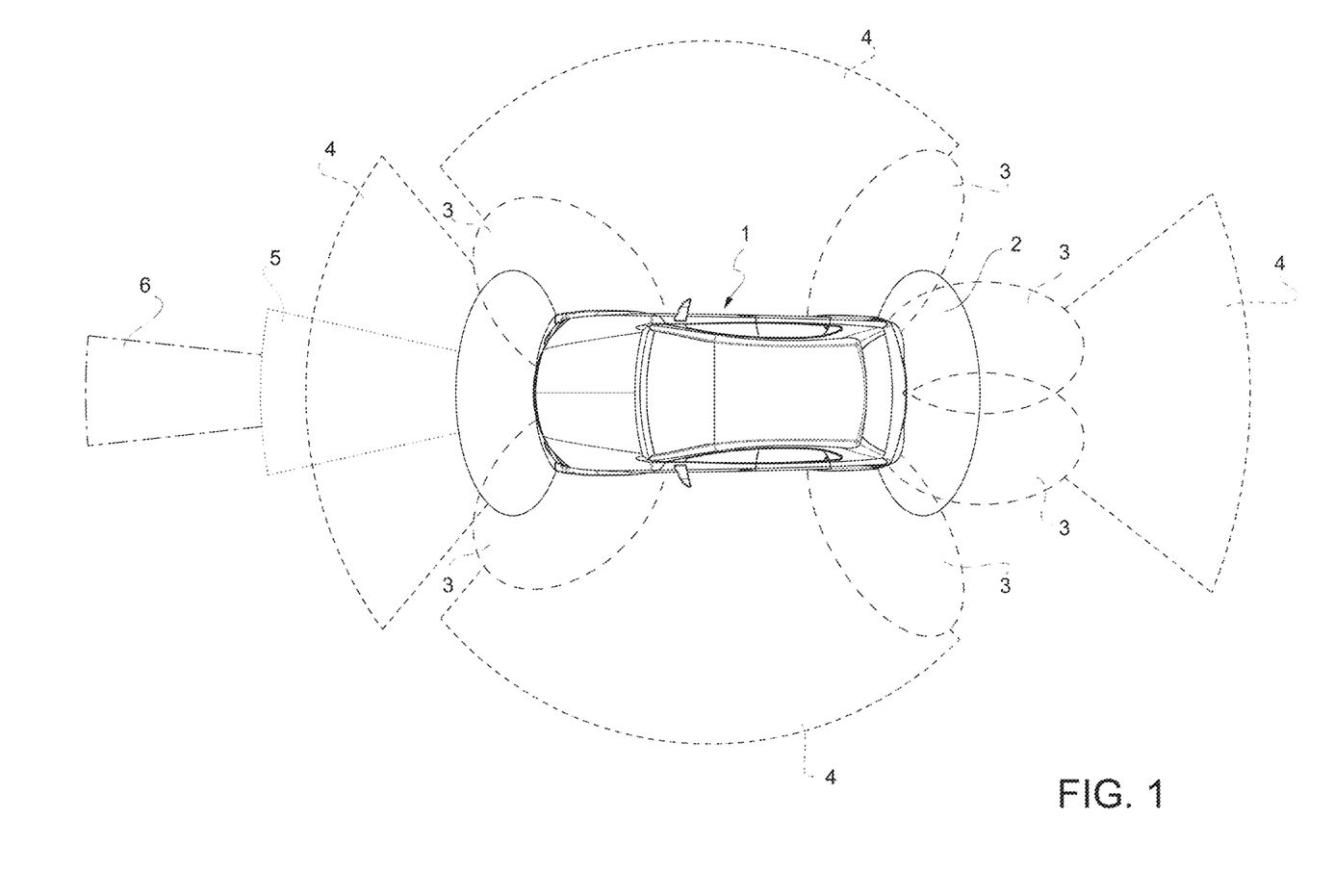
FIG. 1 is a top view of a vehicle and of the field coverage obtainable with an advanced driver assistance system (ADAS)

For example, FIG. 1 shows an Advanced Driver Assistance System (so-called ADAS) including a plurality of safety systems based on different technologies. In particular, FIG. 1 shows a vehicle 1 provided with ultrasound sensors, approximately covering areas delimited by continuous lines 2 and mainly used for parking assistance functions; short/medium range radar sensors, approximately covering areas delimited by long-dashed lines 3 and mainly used for cross traffic alert, blind spot detection and rear collision warning functions; a video camera, approximately covering areas delimited by short-dashed lines 4 and mainly intended for surround view, for traffic sign recognition and for lane departure warning; LIDAR sensors, approximately covering an area delimited by a dotted line 5 and mainly used for emergency braking, pedestrian detection and collision avoidance functions; and a radar approximately covering an area delimited by a dash-and-dot line 6 and mainly used for adaptive cruise control functions.

In particular, as to LIDAR sensors, they generally measure the distance of a surrounding object on the basis of the time elapsed between the emission of a laser pulse and the reception of the signal reflected by the object (so-called Time-of-Flight, ToF, measurement technique).

In general, LIDAR sensors operate on light in the ultraviolet, visible and near-infrared field. For automotive application, it is instead desired that they operate in the non-visible light, typically infrared, with a wavelength of about 900 nm; that have a long detection distance, greater than 100 m, with a measurement resolution of ±15 cm; that the emitted light is not harmful to the human eye; that they are very compact and fast; and have a very good time resolution.

Consequently, LIDAR sensors integrated in electronic devices and made as SPADs (Single-Photon Avalanche Diode), capable of integrating both the emitting portion and the receiving portion, as well as the control electronics, have already been proposed.

Figures 2, 3:
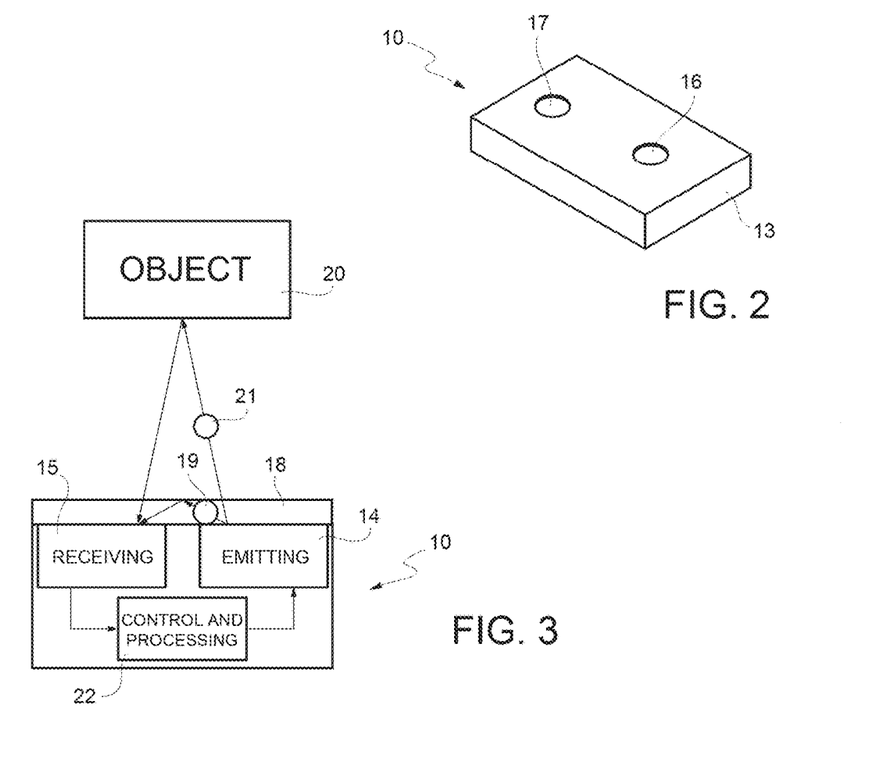
FIG. 2 is a perspective view of a LIDAR device.
FIG. 3 schematically shows the functional structure of a LIDAR device and of the detection mode of an object.
Figure 4:
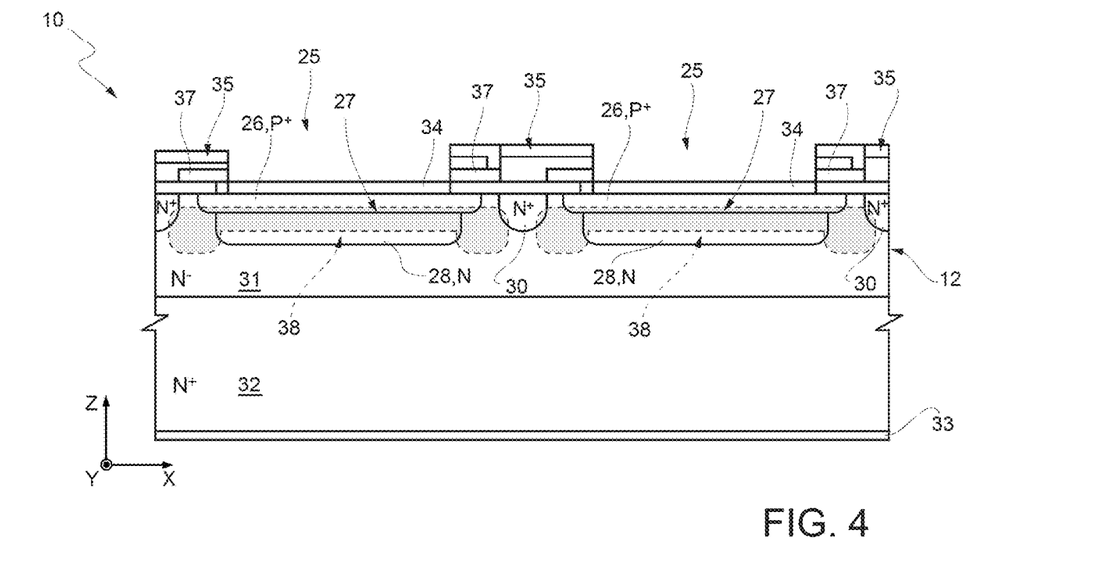
FIG. 4 is a perspective cross-sectional view of a part of a known integrated LIDAR device.

For example, FIGS. 2-4 show a LIDAR device 10, formed in a die 12 of semiconductor material such as silicon (FIG. 4), enclosed in a housing 13 (FIG. 2) and integrating an emitting portion 14 and a receiving portion 15 (FIG. 3). The emitting 14 and receiving 15 portions face respective openings 16, 17 in the housing 13 (FIG. 2).

In the LIDAR device 10, the emitting portion 14 emits a laser beam which is partly reflected on a semi-reflective surface 18 and is immediately received by the receiving portion 15 (FIG. 3 shows a first photon 19, reflected inwardly) and is partly emitted outside the LIDAR device 10, hits an external object 20 and is reflected thereby (FIG. 3 shows a second photon 21, emitted outwardly). In a known manner, the LIDAR device 10 may calculate the distance of the external object 20 from the time elapsed between the reception of the first photon 1 and reception of the second photon 21.

The emitting 14 and reception 15 portions are coupled to an electronic control and processing module 22 which synchronizes the portions 14, 15 and calculates the distance, so as to have reduced detection times.

The emitting portion 14 may be formed by laser diode arrays activated sequentially or in parallel; for example, arrays of SPAD receiving diodes may be used, which may be arranged in a photon multiplier, also called SiPM, Silicon Photomultiplier, configuration.

FIG. 4 shows a portion of a die 12 integrating an array of SPAD diodes, here two SPAD diodes 25 made using standard CMOS technology.

Here, each SPAD diode 25 comprises an anode region 26, having $P^+$-type conductivity, forming a PN junction 27 with a respective implanted region 28, arranged below, and having N-type conductivity. The implanted region 28 forms a drift region and forms the cathode of the respective SPAD diode 25. Channel stop regions 30, of $N^+$-type, electrically separate the SPAD diodes 25 from each other.

The implanted regions 28 extend into an epitaxial layer 31, of $N^-$-type, forming a diffusion layer, overlying a substrate 32, of $N^+$-type. An anode metallization 33 extends below the substrate 32.

Anti-reflective regions 34, surrounded by insulating regions 35, extend on the surface of the epitaxial layer 31, on the anode regions 26. The insulating regions 35, for example formed by a plurality of oxide and/or other dielectric layers, accommodate quenching resistors 37.

The anode regions 26 are shallow and may have a circular or elongated shape in a direction perpendicular to the drawing plane (parallel to axis Y of a Cartesian coordinate system XYZ); in both cases, they have a much greater dimension (in a direction parallel to axis X or Y of the Cartesian coordinate system XYZ) with respect to their depth (in a direction parallel to axis Z).

In use, the SPAD diodes 25 are reversed biased at a high voltage, higher than the breakdown voltage. In the implanted regions 28, under the respective PN junctions 27, respective depletion zones are formed, delimited with dashed line 38 in FIG. 4; here the electric field is so high that current carriers, generated by photons, may activate a short-time, but relatively high, avalanche current, that is collected by the diffusion layer.

The avalanche current continues until it is quenched, lowering the bias voltage, bringing it to the breakdown value, or to a lower value; in this situation, the smaller electric field is no longer able to accelerate the charge carriers sufficiently for them to ionize, by impact, the atoms of the crystal lattice of the drift region 28. Consequently, the current ceases. In order to be able to detect subsequent photons, the bias voltage is again raised above the breakdown voltage.

The known SPAD diodes operate efficiently and advantageously, especially in the UV and visible light field, but are less efficient in the infrared band; in the case of automotive applications, where, as mentioned, it is desired to collect infrared light, even very weak, reflected by distant objects, an increase in their sensitivity is desirable.

As such, the SPAD diodes proposed for automotive applications have very wide anode regions 26, so to increase the junction area and therefore the diode sensitivity and its ability to generate current. For example, SPAD diodes have been proposed having anode regions 26 with a diameter of up to 200 µm, with a depth of 1-2 µm along axis Z.

However, the space available in the die does not allow the size of the junction to be increased sufficiently for the purposes, since it also integrates the emitting portion and the control and processing logic portion.

In order to solve this problem, it has already been proposed to integrate the logic portion in a lower zone of the die, below the receiving and emitting portions 15, 14, by implementing the electrical connections by through silicon vias, as described for example in "First Near-Ultraviolet- and Blue-Enhanced Backside-Illuminated Single-Photon Avalanche Diode Based on Standard SOI CMOS Technology", Myung-Jae Lee, Pengfei Sun, Gregory Pandraud, Claudio Bruschini, and Edoardo Charbon, IEEE JOURNAL OF SELECTED TOPICS IN QUANTUM ELECTRONICS, VOL. 25, NO. 5, SEPTEMBER/OCTOBER 2019.

However, this solution is not suitable for automotive application; in fact it shows a significant reduction in detection efficiency at wavelengths greater than 900 nm, and therefore in the range of frequencies useful for the use in LIDAR.

Furthermore, in known devices, the thin junction does not allow to have a high absorption of photons.

BRIEF SUMMARY

Various embodiments of the present disclosure provide a SPAD diode which overcomes the drawbacks of the prior art.

According to the present disclosure, an opto-electronic device and the manufacturing process thereof are provided. The opto-electronic device is formed in a semiconductor layer of a first conductivity type having a thickness and accommodating at least one deep region of a second conductivity type. The deep region forms a PN junction with the semiconductor layer, and has a depth greater than the width. The deep region is formed by a bottom portion contiguous to a first layer portion of the semiconductor layer, a surface portion contiguous to a second layer portion of the semiconductor layer, and an intermediate portion contiguous to a third layer portion. The concentration of the third layer portion is greater than that of the first and second layer portions.

BRIEF DESCRIPTION OF THE SEVERAL VIEWS OF THE DRAWINGS

For a better understanding of the present disclosure, some embodiments thereof are now described, purely by way of non-limiting example, with reference to the attached drawings, wherein.

DETAILED DESCRIPTION

Figure 5:
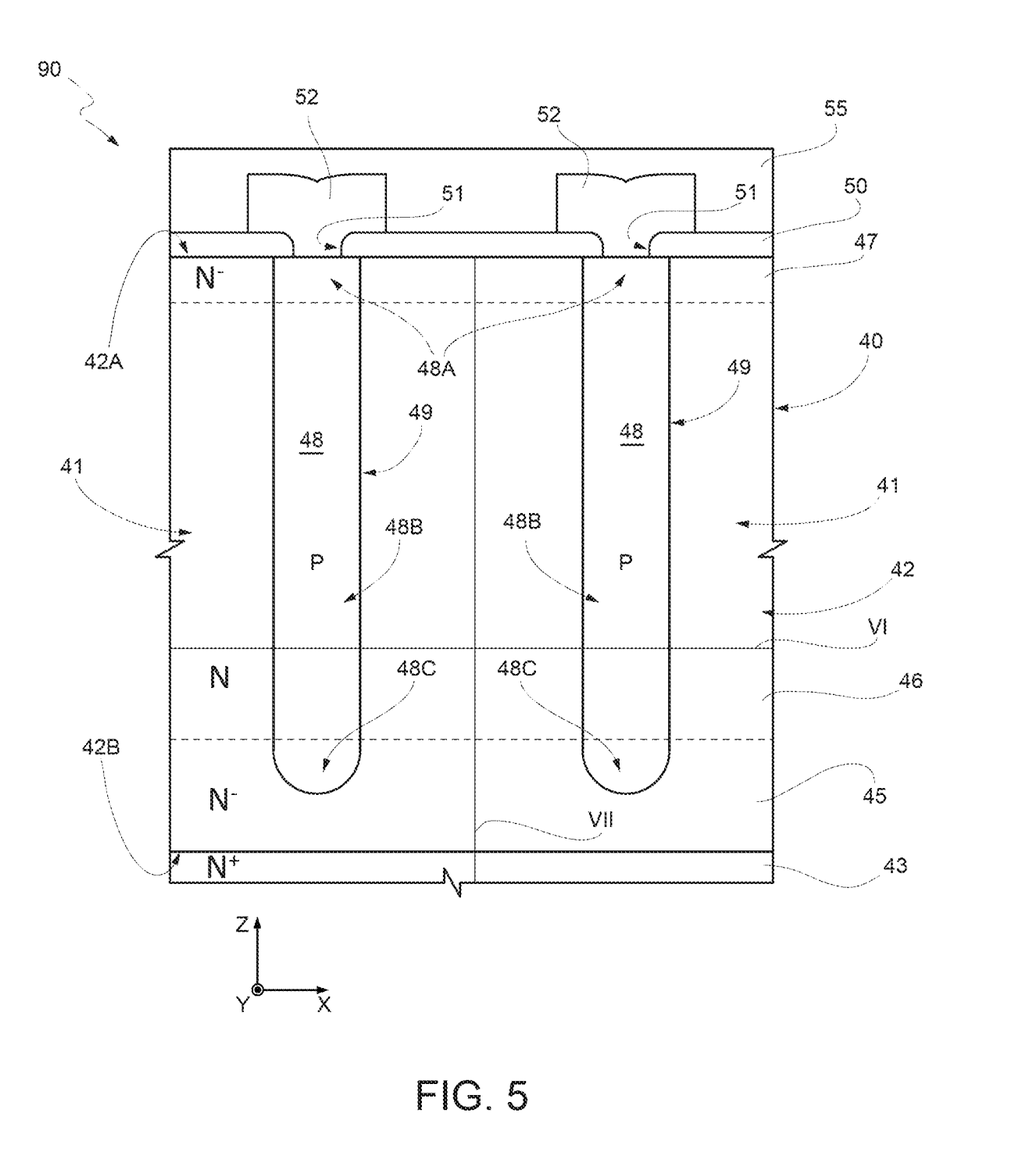
FIG. 5 is a cross-section through a portion of a semiconductor material die integrating a SPAD diode, according to an embodiment.

FIG. 5 shows a portion of a die 40 of semiconductor material, for example silicon, integrating an array of SPAD diodes 41 having a very deep vertical structure and belonging to an opto-electronic device 90. In particular, FIG. 5 shows two SPAD diodes 41; in general, each array may comprise a plurality of SPAD diodes arranged to form a matrix N×M, for example 40×30.

In the embodiment of FIG. 5, the die 40 comprises an epitaxial layer 42 of semiconductor material, for example of silicon, of a first conductivity type, here N-type, and a non-uniform doping level, superimposed on a substrate 43, of the first conductivity type. In particular, herein, the epitaxial layer 42 comprises a lower layer 45, that is less doped, an intermediate layer 46, that is more doped, and a surface layer 47, that is less doped. The substrate 43 has a higher doping level with respect to the epitaxial layer 42.

Figure 7:
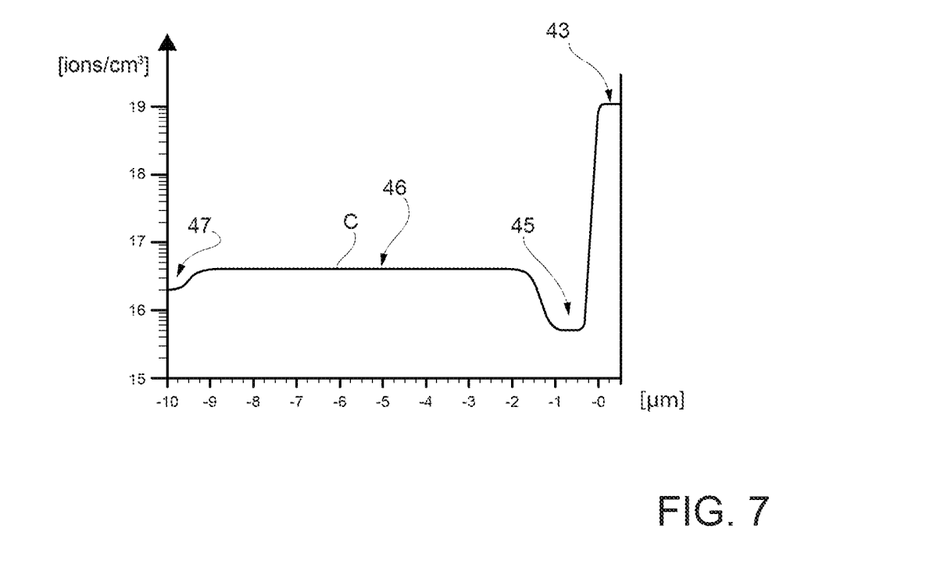
FIG. 7 shows a doping profile of the SPAD diode of FIG. 5 along vertical line VII of FIG. 5.

For example, the substrate 43 may have a doping ion concentration of the order of $10^{19}$ cm$^{-3}$; the lower layer 45 may have a doping ion concentration of the order of $10^{15}$-$10^{16}$ cm$^{-3}$; the intermediate layer 46 may have a doping ion concentration of the order of $10^{16}$-$10^{17}$ cm$^{-3}$ and the surface layer 47 may have a doping ion concentration of the order of $10^{15}$-$10^{16}$ cm$^{-3}$, but lower than the intermediate layer 46, as visible in doping profile shown in FIG. 7 which shows the doping ion concentration along a vertical line through the epitaxial layer 42, between two SPAD diodes 41. For example, the substrate 43, the lower layer 45, the intermediate layer 46 and the surface layer 47 may all be doped with phosphorus.

In one embodiment, as shown in FIG. 5, the intermediate layer 46 is thicker than each of the lower layer 45 and the surface layer 47, along a third axis Z of a Cartesian reference system XYZ.

The epitaxial layer 42 accommodates a plurality of deep regions 48, of a second conductivity type, here of P-type, for example doped with boron at a concentration comprised between $5*10^{16}$ and $5*10^{17}$ cm$^{-3}$. The deep regions 48 form a junction 49 with the epitaxial layer 42.

The deep regions 48 extend into the epitaxial layer 42, side by side, and parallel to each other, at a mutual distance. For example, the deep regions 48 may be arranged at a distance (in a direction parallel to a first axis X of a Cartesian reference system XYZ also having a second axis Y and a third axis Z) that is greater than 1.4 µm, in particular of 3-4 µm, and have a very small width (parallel to first axis X), for example comprised between 0.7 and 5 µm. In particular, the deep regions 48 may have a circular shape (in a plane parallel to plane XY) or have the shape of strips extending along second axis Y; e.g., the strips may be very long, up to 1 mm.

The deep regions 48 also have a depth (in a direction parallel to third axis Z of the Cartesian reference system XYZ) much greater with respect to the width in X-direction. In particular, the deep regions 48 extend through the surface layer 47, the intermediate layer 46 and part of the lower layer 45, for a depth of, e.g., 10 μm. In general, the depth may be at least five times, typically ten times or more, the width. For example, the deep regions 48 may have a depth between 8 and 12 μm, and a width between 1 and 2 μm.

Consequently, each deep region 48 has a surface portion 48A, surrounded by the surface layer 47, an intermediate portion 48B, surrounded by the intermediate layer 46, and a bottom portion 48C, surrounded by the lower layer 45. For example, the surface portion 48A is in direct contact, interfaces with the surface layer 47; the intermediate portion 48B is in direct contact, interfaces with the intermediate layer 46; and the bottom portion 48C is in direct contact, interfaces with the lower layer 45.

As an alternative to what is shown, the bottom portion 48C may reach the lower layer 45, without extending substantially therein (except for any partial diffusion); in this case, the lower layer 45 delimits the bottom portion 48C downwardly.

If the first conductivity type is N and the second conductivity type is P, then, the deep regions 48 form anode regions and the epitaxial layer 42 forms a cathode region, common for the SPAD diodes 41.

Due to the vertical structure of the deep regions 48, the junction 49 of each SPAD diode 41 has a wide area.

The epitaxial layer 42 has an upper surface 42A having an insulating layer 50 extending thereon; and a lower surface 42B contiguous to the substrate 43.

The insulating layer 50 has contact openings 51 at the deep regions 48. Contact regions 52, of metal, extend through the contact openings 51 and partially on the insulating layer 50 and each electrically contact a respective deep region 48. A passivation layer 55 covers the insulating layer 50 and the contact regions 52.

Figure 6:
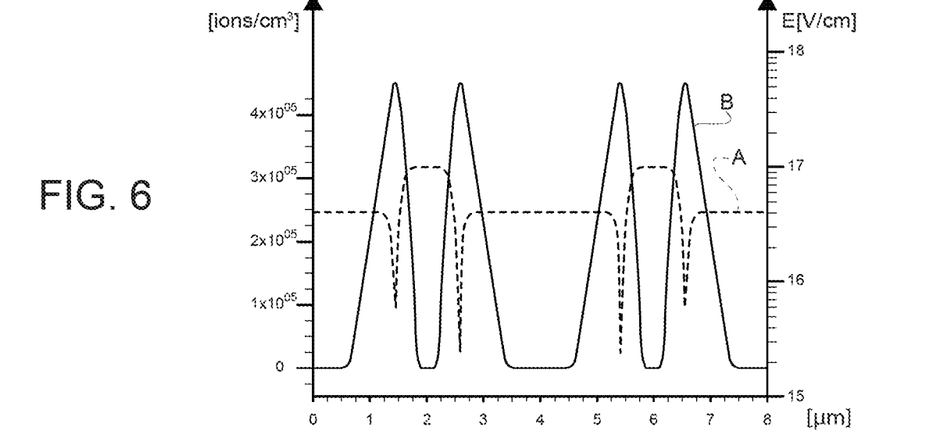
FIG. 6 shows a doping profile of the SPAD diode of FIG. 5 and the corresponding trend of the electric field along horizontal line VI of FIG. 5.

In reverse bias, in a known manner, a high electric field establishes on junction 49, as shown in FIG. 6 by curve B, superimposed on curve A showing the doping profile along the horizontal line VI of FIG. 5. As is noted, the electric field E has strong peaks at the junctions 49 (where the inversion of the conductivity type occurs, represented by negative peaks of curve A).

Thanks to the wide junction area of each SPAD diode 41, and therefore to the wide zone where the avalanche generation of carriers may be activated, the SPAD diodes 41 have high sensitivity.

In fact, studies by the literature shown that, at wavelengths comprised between 905 and 940 nm, the absorption depth, i.e., the depth at which a fraction [(e−1)/e] of the impinging photons has been absorbed, is of 30-50 μm, thus considerably increasing the size of the photon absorption zone with respect to known solutions.

Furthermore, the doping variability in the depth direction (parallel to third axis Z) allows the intensity of electric field E to be reduced in the upper and lower junction zones (zones formed by the surface portions 48A and by the bottom portions 48C of the deep regions 48 with the lower layer 45 and, respectively, with the surface layer 47), concentrating it in the zone of the intermediate portion 48B.

In this manner, the electric field is prevented from concentrating in these upper and lower junction zones, and causing a premature breakdown, which might lead to incorrect operation of the SPAD diodes 41.

Figure 8:
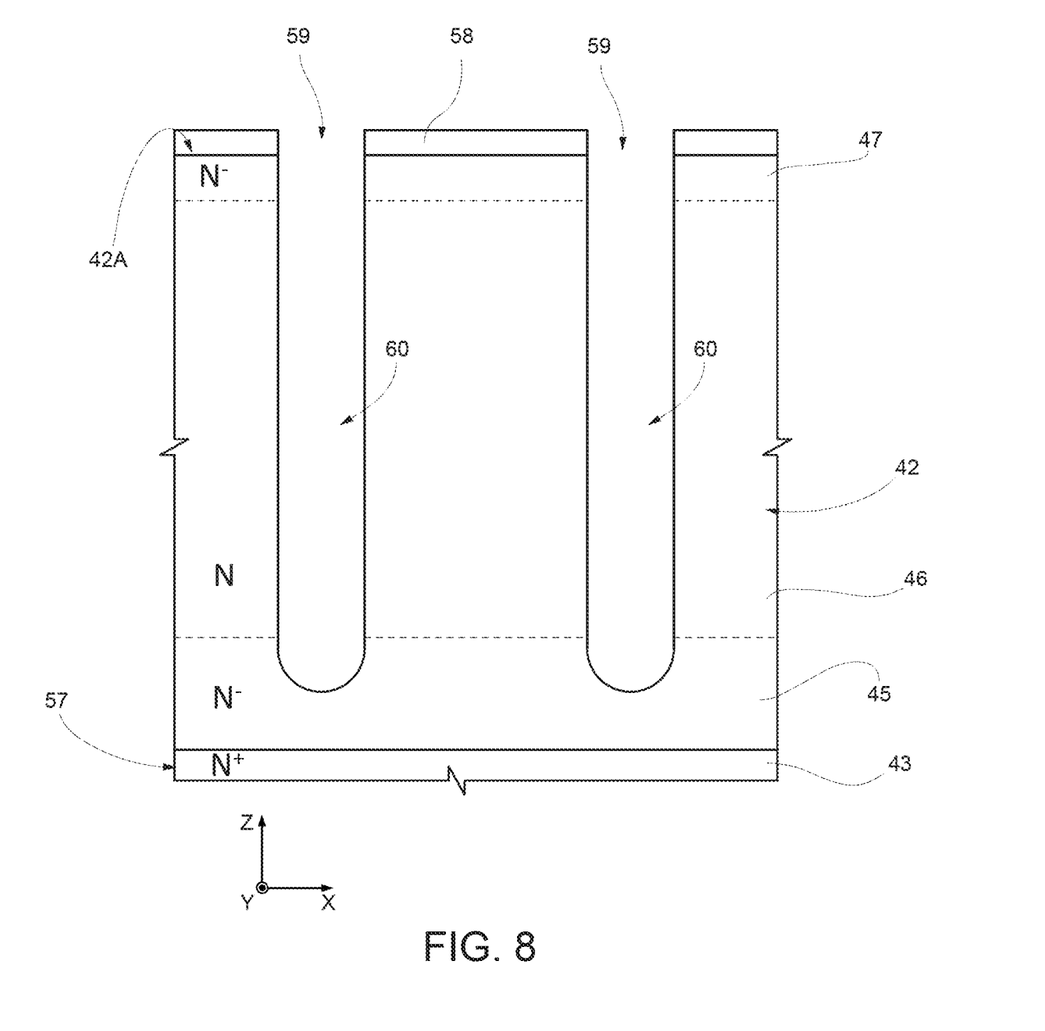
FIG. 8 is a cross-section through the die portion of FIG. 5, in an intermediate manufacturing step.

The structure of FIG. 5 may be manufactured as follows (reference is also made to FIG. 8, showing an intermediate structure).

Manufacturing starts from a wafer 57 forming the substrate 43; wafer 57 is doped with ions intended to confer the first conductivity type, for example with phosphorus, to have a concentration, e.g., of the order of $10^{19}$ cm$^{-3}$;

the lower layer 45, also doped with ions intended to confer the first conductivity type, for example with phosphorus, to have a concentration, e.g., of the order of $10^{15}$-$10^{16}$ cm$^{-3}$, is epitaxially grown on the substrate 43, for a thickness for example comprised between 0.2 and 2 μm;

the intermediate layer 46, doped with ions intended to confer the first conductivity type, for example with phosphorus, to have a concentration, e.g., of the order of $10^{16}$-$10^{17}$ cm$^{-3}$, is epitaxially grown on the lower layer 45, for a thickness for example comprised between 2 and 40 μm;

the surface layer 47, doped with ions intended to confer the first conductivity type, for example with phosphorus, to have a concentration, e.g., of about $10^{15}$-$10^{16}$ cm$^{-3}$, is epitaxially grown on the intermediate layer 46 for a thickness for example comprised between 0.1 and 1 μm. The epitaxial layer 42 is thus formed, and has the upper surface 42A;

an oxide layer 58 is deposited on the upper surface 42A of the epitaxial layer 42;

oxide openings 59 are formed through a photolithographic technique, in the oxide layer 58; and the epitaxial layer 42 is selectively removed under the oxide openings 59, forming trenches 60. The trenches may have a depth comprised between 2 and 40 μm.

The intermediate structure of FIG. 8 is thus obtained.

Subsequently, with reference to FIG. 5, the trenches 60 are filled, for example by epitaxially growing silicon doped with ions intended to confer the second conductivity type, e.g., with boron, to form the deep regions 48 having, for example, a concentration comprised between $5*10^{16}$ and $5*10^{17}$ cm$^{-3}$;

thermal annealing and oven diffusion steps are carried out (e.g., through a Rapid Thermal Processing—RPT);

the oxide layer 58 is removed and the insulating layer 50 is deposited;

the insulating layer 50 is etched, to form the contact openings 51;

a metal layer is deposited and fills the contact openings 51;

the metal layer is defined, to form the contact regions 52;

the passivation layer 55 is deposited; and the wafer 57 is diced to form the die 40.

Before depositing the dielectric layer, other manufacturing steps may be performed for forming an emitting portion and a control and processing portion of a LIDAR device, as described with reference to FIG. 3.

According to other embodiments, the trenches 60 are filled with polycrystalline silicon or doped amorphous silicon. In this manner, the wafer is subject to thermal steps at a lower temperature with respect to the epitaxial growth of the deep regions 48. Consequently, the doping atoms of the deep regions 48 have lower lateral diffusion and structures having smaller dimensions may be formed, with some other electrical characteristics.

According to other embodiments, the trenches 60 are filled with polycrystalline or amorphous silicon or with dielectric material, after the walls of the trenches have been doped with ions capable of conferring the second conductivity type.

Figure 9:
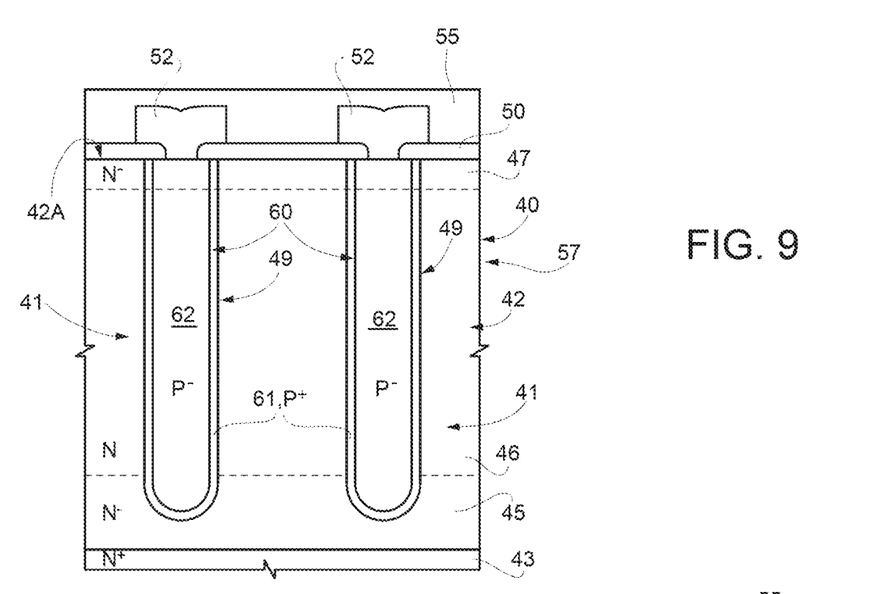
FIGS. 9-13 are cross-sectional views of other embodiments of the present SPAD diode.

For example, see FIG. 9, after forming the trenches 60, different inclined implantation steps are performed, while rotating the wafer 57. In particular, by rotating the wafer 57 completely, a first implantation may be performed at an angle of 2°-10°, with a dose comprised between $5*10^{13}$ and $5*10^{14}$ cm$^{-2}$, an energy of, e.g., 10-100 keV, to form a highly doped layer, of the second conductivity type, along the walls and at the bottom of the trenches 60.

Then, in the embodiment of FIG. 9, the trenches 60 are filled with polycrystalline or amorphous silicon, and a thermal annealing and an oven baking are performed, proceeding as described above.

In this manner, during thermal treatment, the implanted dopant diffuses into the filling material, creating a peripheral zone 61 that is more doped and forms the junction 49 with the epitaxial layer 42, and a central region 62, less doped. It should be noted that, although in FIG. 9 the peripheral zone 61 and the central zone 62 are indicated in a distinct manner, in general the transition is gradual.

Figure 10:
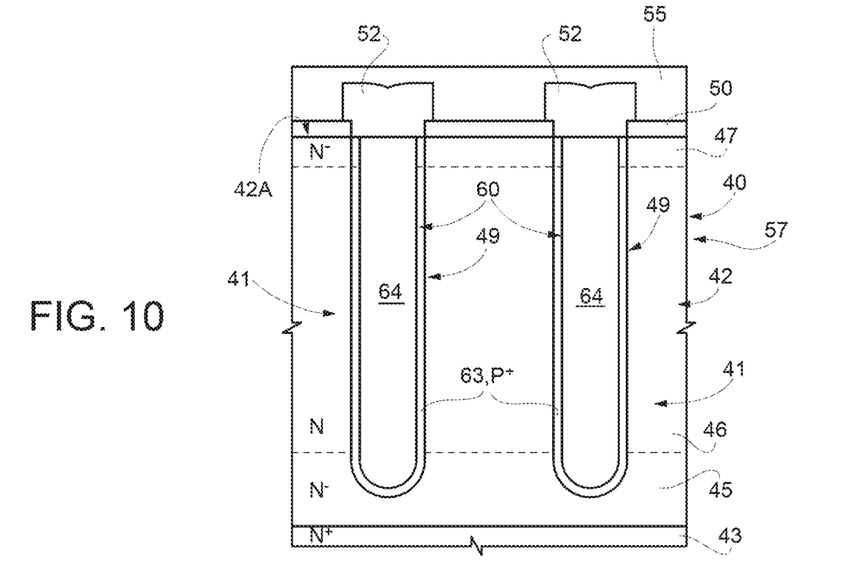

In the embodiment of FIG. 10, after implanting the highly doped layer of the second conductivity type, the trenches 60 are filled with dielectric material (filling dielectric 64). In each SPAD diode 41, therefore, the implanted dopant of the second conductivity type remains substantially confined in the peripheral zone, indicated with 63 and forming the junction 49 with the adjacent epitaxial layer 42.

In both solutions of FIGS. 9 and 10, a peripheral zone 61 or 63 is obtained, having tubular shape, with very high concentration. This enables to obtain, when each SPAD diode 41 is biased, a high electric field at the junction 49, increasing the detection speed.

According to yet another embodiment, the epitaxial layer and the deep regions may be formed through repeated growth and doping of relatively thin layers, thus avoiding forming the trenches 60.

Figure 11:
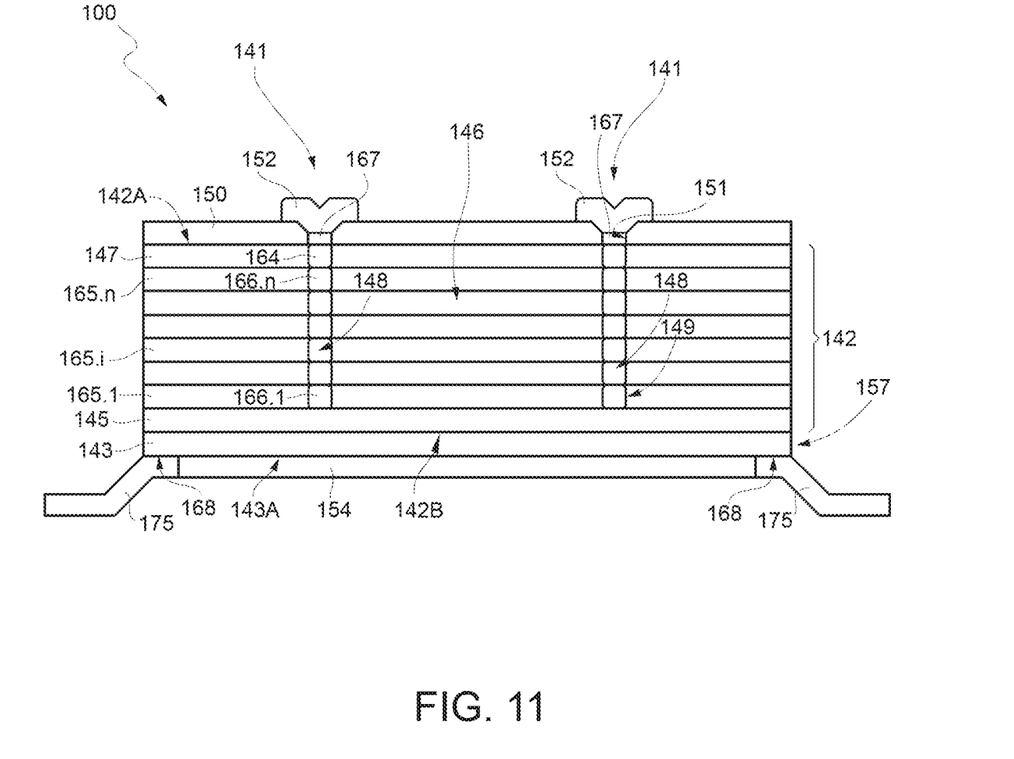

For example, FIG. 11 shows an opto-electronic device 100 integrating an array of SPAD diodes 141 (two of which are shown), where the epitaxial layer, indicated by 142, comprises a lower layer 145, less doped, an intermediate layer 146, more doped, and a surface layer 147, less doped.

The intermediate layer 146 is formed by a plurality of sub-layers 165, deposited in sequence, each sub-layer being doped where the deep regions are desired to be formed, indicated as a whole by 148.

For example, the opto-electronic device 100 of FIG. 11 may be manufactured as follows:
a) the process starts from a wafer 157 comprising a base layer 143, for example a substrate or an epitaxial layer having a rear surface 143A. The base layer 143 is highly doped to have the first conductivity type, for example with phosphorus to have a concentration, e.g., of the order of $10^{19}$ cm$^{-3}$;
b) the lower layer, here indicated by 145, also doped to have the first conductivity type, for example with phosphorus, to have, for example, a concentration of doping atoms of the order of, e.g., $10^{15}$-$10^{16}$ cm$^{-3}$, is formed, for example epitaxially grown, on the base layer 143; the lower layer 145 may have a thickness comprised between 0.2 and 2 µm;
c) a first sub-layer 165.1, doped to have the first conductivity type, for example with phosphorus, to have a concentration of doping atoms, e.g., of the order of $10^{16}$-$10^{17}$ cm$^{-3}$, is epitaxially grown on the lower layer 145; the first sub-layer 165.1 may have a thickness comprised between 0.5 and 5 µm;
d) first deep sub-regions 166.1, of the second conductivity type, are formed in the first sub-layer 165.1. The first deep sub-regions 166.1 may have a circular or elongated shape and may be formed by masked ion implantation and rapid thermal activation, to have, for example, a doping atom concentration of the order of $10^{17}$-$10^{19}$ cm$^{-3}$, for a width (parallel to both first axis X and second axis Y) comprised between 0.2 and 4 µm. The first deep sub-regions 166.1 in the first sub-layer 165.1 are arranged at a distance of at least 1.4 µm from each other;
e) steps c) and d) are repeated many times to provide n sub-layers 165.1+1, . . . , 165.i, . . . , 165.n, each accommodating respective deep sub-regions 166.1+1, . . . , 166-i, . . . , 166.n, where the deep sub-regions from 166.1 to 166.n have same shape, same size and are mutually superimposed. The intermediate layer 146, having a thickness comprised between, e.g., 0.2 and 40 µm, and the deep regions 148 are thus formed;
f) the surface layer 147, doped to have the first conductivity type, for example with phosphorus, to have a concentration, e.g., of about $5*10^{15}$-$5*10^{16}$ cm$^{-3}$, is formed, for example epitaxially grown, on the intermediate layer 146, for a thickness comprised between 0.1 and 1 µm. In this manner the epitaxial layer 142 is formed, forming junctions 149 with the deep regions 148 and having upper surface 142A and lower surface 142B in contact with the base layer 143;
g) upper doped regions 164, of the second conductivity type, are formed in the surface layer 147, superimposed on and vertically aligned with the deep regions 148. For example, the upper doped regions 166 may be formed by masked ion implantation and rapid thermal activation, with a doping atom concentration of the order of $5*10^{19}$-$5*10^{20}$ cm$^{-3}$, with a width (parallel to both first axis X and second axis Y) comprised between 0.18 and 2 µm;
h) an upper dielectric layer 150 is formed above the upper surface 142A of the epitaxial layer 142. The upper dielectric layer 150 may be a multilayer and may comprise an anti-reflective coating and/or optical fibers, if the opto-electronic device 100 is intended to work in front light conditions;
i) a lower dielectric layer 154 is formed below the rear surface 143A of the base layer 143. The lower dielectric layer 154 may be a multilayer and may comprise an anti-reflective coating and/or optical fibers, in case the opto-electronic device 100 is intended to work in rear light conditions;
j) diode contact openings 151 are formed in the upper dielectric layer 150 and diode plug regions 167, e.g., tungsten plugs, are formed therewithin in direct electrical contact with the deep regions 148;
k) a first metal layer is deposited and defined to form upper contact regions 152, above and in direct electrical contact with the diode plug regions 167; in a manner not shown, the upper contact regions 152 may be part of interconnections extending above the upper dielectric layer 150 to electrically connect the SPAD diodes 141 to each other and/or to other components integrated in the same opto-electronic device 100. Furthermore, for an opto-electronic device made as Deep SiPM (Deep Silicon PhotoMultiplier), the upper contact regions 152 connect the SPAD diodes 141 to polysilicon quenching resistors, not shown, formed within the upper dielectric layer 150; and
l) the lower dielectric layer 154 is selectively removed at exposed portions 168, to access the base layer 143 and allow the electrical connection thereof. The exposed portions 168 are arranged for example at corners or edges of the opto-electronic device 100; lower contact regions 175 are then formed or applied on the exposed portions 168. The lower contact regions 175 may be deposited metal regions, or metal clips bonded after dicing, in the case of packaging at the chip level. In all cases, the lower contact regions 175 are in electrical contact with the base layer 143 and with the epitaxial layer 142 and therefore with the cathode region, in case the first conductivity type is N and the second conductivity type is P.

The solution of FIG. 11 may be manufactured using machines commonly available in the semiconductor field, with easily executable process steps and without carrying out deep trenching, and therefore at low costs.

Figure 12:
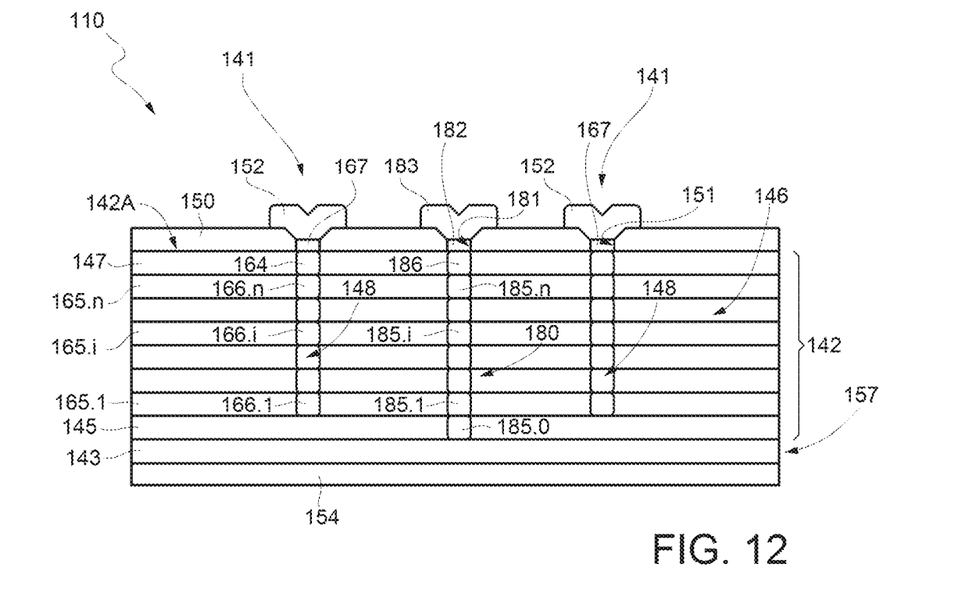

FIG. 12 shows an opto-electronic device 110 where a pillar 180 of the first conductivity type, but higher doping level with respect to the epitaxial layer 142, is formed between two deep regions. This solution, which may also be applied to the embodiments of FIGS. 5, 9 and 10, is shown here for the solution of FIG. 11, and therefore like parts are indicated with the same reference numbers of FIG. 11 and are not further described.

The pillar 180 may have, for example, a doping ion concentration of the order of $10^{17}$-$10^{19}$ cm$^{-3}$, a width of 0.2-4 μm and be spaced from the deep regions 148 by a distance of at least 1.4 μm.

In FIG. 12, the pillar 180 extends between the upper surface 142A of the epitaxial layer 142 and the base layer 143 and is in direct electrical contact with the latter.

The upper dielectric layer 150 has a pillar contact opening 181 accommodating a pillar plug region 182 similar to the diode plug regions 167, e.g., tungsten plugs, in direct electrical contact with the pillar 180. A pillar contact region 183, similar to the upper contact regions 152, extends partly into the pillar contact opening 181 and partly thereabove and allows the cathode region (also formed here by the base region 143 and the epitaxial layer 142) to be electrically coupled with the outside, reducing the series resistance. In this case, therefore, the lower dielectric layer 154 completely covers the base layer 143 and there are no lower contact regions.

The opto-electronic device 110 may be manufactured in a similar way to what described for the opto-electronic device 100 of FIG. 11, except that, after growing each sub-layer 165.1, before or after forming the deep sub-regions 166.i, one or more pillar sub-regions 185.i are formed, superimposed on and vertically aligned with the pillar sub-regions already formed in lower sub-layers. Furthermore, a pillar sub-region 185.0 is also formed in the lower layer 145, below the pillar sub-regions 185.i, and electrically connects the pillar 180 to the base layer 143.

The pillar sub-regions 185.i may also be formed by masked ion implantation with ions intended to confer the first conductivity type (e.g., with phosphorus) and rapid thermal activation (the latter, possibly carried out simultaneously with the corresponding deep sub-regions 166.i). The pillar sub-regions 185.i may have doping ion concentration of the order of $10^{17}$-$10^{19}$ cm$^{-3}$, width of 0.2-4 μm and be spaced from the corresponding deep sub-regions 166.i of at least 1.4 μm.

Furthermore, an upper pillar region 186 is formed in the surface layer 147, superimposed on and vertically aligned with the pillar sub-region 185.n. For example, the upper pillar region 186 may be formed by masked ion implantation with ions intended to confer the first conductivity type (e.g., with phosphorus) and rapid thermal activation, with a doping atom concentration of the order of $10^{17}$-$5*10^{19}$ cm$^{-3}$, for a width (parallel to both the first axis X and the second axis Y) comprised between 0.2 and 4 μm.

The pillar contact region 183 may be formed similarly and simultaneously to the upper contact regions 152.

Thanks to the high doping level of the pillar 180, the series resistance of the SPAD diodes 141 may be reduced.

In case of an opto-electronic device 110 made as Deep SiPM, the pillar 180 may be used as a quenching resistor.

The opto-electronic device 110 may have one or more pillars 180, arranged between adjacent deep regions 148.

Figure 13:
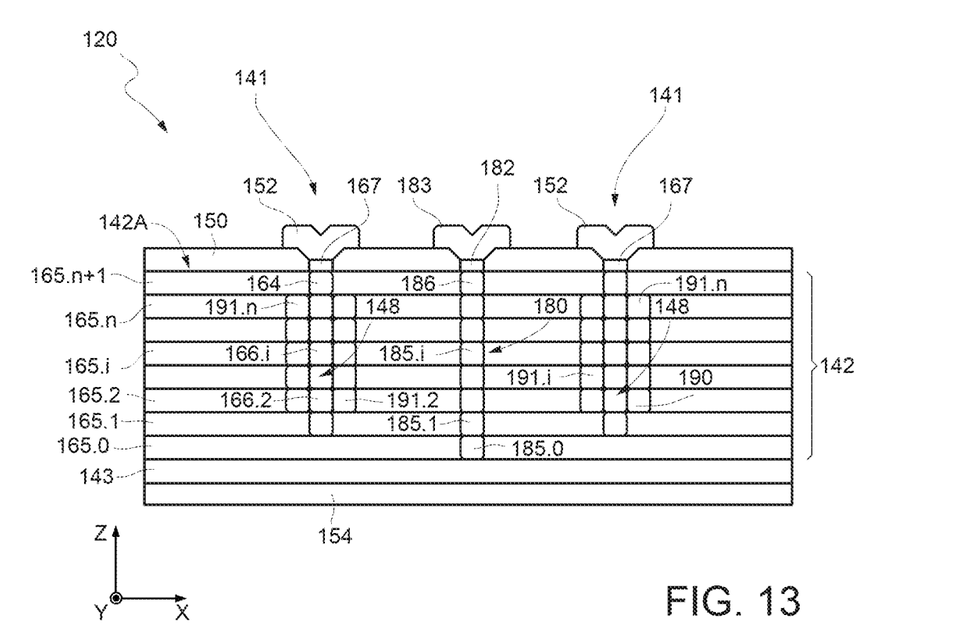

FIG. 13 shows an opto-electronic device 120 similar to the opto-electronic device 110 of FIG. 12. In the opto-electronic device 120, increased doped regions 190 extend on the sides of each deep region 148, for a height portion thereof, and the epitaxial layer 142 has uniform doping throughout its thickness. The lower layer 145 and the upper layer 147 of FIG. 12 are then replaced by two sub-layers 165.0 and 165.n+1, having the same doping level as the sub-layers from 165.1 to 165.n.

In case the deep regions 148 have a circular or oval section, the increased doped regions 190 extend therearound; in case they are formed by long strips, with a greater dimension in a direction parallel to second axis Y, they extend on the two major sides of the deep regions 148 (as visible in the section of FIG. 13).

The increased doped regions 190 have the first doping type, here of N-type, and intermediate doping level between that of the epitaxial layer 142 and that of the pillar 180. For example, the increased doped regions 190 may have doping ion concentration (e.g., phosphorus) of the order of $10^{16}$-$10^{17}$ cm$^{-3}$, and a width of 0.2-4 μm.

The increased doped regions 190 may be formed by superimposing the increased doped sub-regions 191.i, wherein i is the layer index 165, similarly to the deep regions 148 and the pillar 180.

In this case, after growing each sub-layer 165.i, from the sub-layer 165.2 and up to the sub-layer 165.n, the first deep sub-regions 166.i, the partial pillar region(s) 185.i and the increased doped sub-regions 191.i are formed, for example through separate masked ion implantation steps, and a single rapid thermal activation for each sub-layer 165.i.

With the solution of FIG. 13, the breakdown zone is more localized, avoiding different doping levels of the epitaxial layer 142.

Furthermore, if the increased doped regions 190 have the same doping level as the pillar 180, the opto-electronic device 120 may be manufactured using steps that are the same as for the opto-electronic device 110 of FIG. 12, with modifying the implantation masks.

Finally, it is clear that modifications and variations may be made to the opto-electronic device and the manufacturing process described and illustrated herein without thereby departing from the scope of the present disclosure, as defined in the attached claims.

For example, the different embodiments described may be combined to provide further solutions. In particular, an opto-electronic device may have increased doped regions 190, as described with reference to FIG. 13, without however forming the pillar 180. For example, the increased doped regions 190 may also be formed in the opto-electronic device 100 of FIG. 11. Furthermore, the opto-electronic device of FIG. 5 may be manufactured with lower contact regions 175, as shown in FIG. 11.

The pillar 180 may also be formed in the opto-electronic devices 90 of FIGS. 5-10, using a specific trenching.

Furthermore, the P-N conductivity types may be exchanged with respect to the above; therefore the first conductivity type may be P and the second conductivity type may be N.

An opto-electronic device of semiconductor material may be summarized as including a semiconductor layer (42; 142)

of a first conductivity type, the semiconductor layer having a thickness in a first direction (Z); and at least one deep region (48; 61; 63; 148) of a second conductivity type extending into the semiconductor layer and forming a PN junction (49; 149) with the semiconductor layer, wherein the deep region (48; 61; 63; 148) has a depth along the first direction (Z) and a width in a second direction (X) perpendicular to the first direction, the depth being greater than the width, the deep region including a bottom portion (48C; 166.1), an intermediate portion (48B; 166.i) and a surface portion (48A; 164); and wherein the semiconductor layer (42; 142) includes a first layer portion (45; 145) contiguous to the bottom portion (48C; 166.1) of the deep region and having a first doping ion concentration, a second layer portion (47; 147) contiguous to the surface portion (48A; 164) of the deep region and having a second doping ion concentration, and a third layer portion (46; 146; 190), contiguous to the intermediate portion (48B; 166.i) of the deep region and having a third doping ion concentration, wherein the third concentration is greater than the first and second concentrations.

The deep region (48; 148) may include a solid cylindrical region, of doped silicon chosen among monocrystalline silicon, polycrystalline silicon and amorphous silicon and having a substantially uniform doping ion concentration along the width direction.

The deep region may include a solid cylindrical region, of doped silicon chosen among monocrystalline silicon, polycrystalline silicon and amorphous silicon, the deep region comprising a peripheral portion (61) surrounding a central portion (62), wherein the peripheral portion (61) has a higher doping ion concentration with respect to the central portion (62).

The deep region may include a tubular cylindrical region (63) surrounding a dielectric region (64).

The semiconductor layer (42; 142) may include a lower layer (45; 145), forming the first layer portion; a surface layer (47; 147), forming the second layer portion; and an intermediate layer (46; 146), forming the third layer portion, the lower layer (45; 145) having the first doping ion concentration, the surface layer (47; 147) having the second doping ion concentration, and the intermediate layer (46; 146) having the third doping ion concentration.

The semiconductor layer 142 may include a constant concentration portion (165.0, 165.1, 165.n+1) forming the first and the second layer portions and a fourth layer portion (165.2-165.n), the fourth layer portion surrounding the third layer portion (190).

The semiconductor layer (42; 142) may have a first and a second surface (42A; 142A, 42B; 142B), the deep region extends from the first surface (42A; 142A) of the semiconductor layer (42; 142) towards the second surface (42B; 142B) of the semiconductor layer, and the opto-electronic device (90; 100; 110; 120) further comprises a base region (43; 143) adjacent to the second surface of the semiconductor layer, the base region having the first conductivity type and a fourth doping ion concentration, greater than the first and second concentrations.

The opto-electronic device may further include a pillar (180) extending throughout the thickness of the semiconductor layer (142), between the first and second surfaces (142A, 142B), at a distance from the deep region (148), in direct electrical contact with the base region (143).

A process for manufacturing an opto-electronic device of semiconductor material, may be summarized as including forming a semiconductor layer (42; 142) of a first conductivity type, the semiconductor layer having a thickness in a first direction (Z); and forming at least one deep region (48; 61; 63; 148) of a second conductivity type in the semiconductor layer, the deep region forming a PN junction (49; 149) with the semiconductor layer and comprising a bottom portion (48C; 166.1), an intermediate portion (48B; 166.i) and a surface portion (48A; 164), wherein the deep region has a depth along the first direction (Z) and a width in a second direction (X) perpendicular to the first direction, the depth being greater than the width; and wherein the semiconductor layer has a first layer portion (45; 145) contiguous to the bottom portion (48C; 166.1) of the deep region and having a first doping ion concentration, a second layer portion (47; 147) contiguous to the surface portion of the deep region and having a second doping ion concentration and a third layer portion (46; 146; 190), contiguous to the intermediate portion (48B; 166.i) of the deep region and having a third doping ion concentration, wherein the third concentration is greater than the first and second concentrations.

Forming a semiconductor layer (42) may include forming a lower layer (45), comprising the first layer portion;
forming an intermediate layer (46), comprising the third layer portion, above the lower layer; and
forming a surface layer (47), comprising the second layer portion, the lower layer having the first doping ion concentration, the surface layer having the second doping ion concentration, and the intermediate layer having the third doping ion concentration.

Forming the deep region (48) may include forming a trench (60) extending through the semiconductor layer (42); and filling the trench with doped silicon (48) chosen among monocrystalline silicon, polycrystalline silicon and amorphous silicon and having a substantially uniform doping ion concentration along the width direction.

Forming the deep region may include forming a trench (60) extending through the semiconductor layer (42), the trench having a wall; introducing doping ionic species intended to confer the second conductivity type in the semiconductor layer (42) in proximity to the trench wall; filling the trench (60) with a filling material (62; 64) chosen among polycrystalline silicon, amorphous silicon and dielectric material.

Introducing doping ionic species comprises carrying out a tilted implantation of the doping ionic species intended to confer the second conductivity type.

The process may include forming a first epitaxial sub-layer (165.1); selectively introducing, in the first epitaxial layer, doping ionic species intended to confer the second conductivity type, and forming a first deep sub-region (166.1); forming a subsequent epitaxial sub-layer (165.2) above the first epitaxial layer; selectively introducing, in the subsequent epitaxial sub-layer and vertically aligned with the first deep sub-region (166.1), doping ionic species intended to confer the second conductivity type and forming a subsequent deep sub-region (166.2) superimposed on and contiguous to the first deep sub-region; repeating the steps of forming a subsequent epitaxial sub-layer (165.2) and selectively introducing.

The first epitaxial sub-layer (165.1) and the subsequent epitaxial sub-layers (165.2-165.n+1) may have a constant doping level, the process further comprising forming an increased doped region (190), of the first conductivity type, surrounding the deep region (148) and forming a third layer portion.

Forming an increased doped region (190) may include introducing doping ionic species into the subsequent epitaxial sub-layer (165.2), adjacent to the subsequent deep sub-region (166.2), to form a first increased doped sub-region (192.2), and repeating forming an increased doped region superimposed on and contiguous to the first increased doped sub-region.

The semiconductor layer (142) may have a first and a second surface (142A, 142B), the deep region (148) extends from the first surface (142A) of the semiconductor layer towards the second surface (142B) of the semiconductor layer, the process further comprising:

forming a base region (143) adjacent to the second surface of the semiconductor layer, the base region having the first conductivity type and a fourth doping ion concentration, greater than the first and second concentrations; and forming a pillar (180) extending throughout the thickness of the semiconductor layer, between the first and second surfaces, at a distance from the deep region, in direct electrical contact with the base region.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An opto-electronic device, comprising:
   a semiconductor layer of a first conductivity type, the semiconductor layer having a thickness in a first direction; and
   at least one deep region of a second conductivity type extending into the semiconductor layer and forming a PN junction with the semiconductor layer, the deep region including a bottom portion, an intermediate portion, and a surface portion,
   wherein the deep region has a depth along the first direction and a width in a second direction transverse to the first direction, the depth being greater than the width, and
   wherein the semiconductor layer includes:
      a first layer portion contiguous with the bottom portion of the deep region, and having a first doping ion concentration;
      a second layer portion contiguous with the surface portion of the deep region, and having a second doping ion concentration; and
      a third layer portion contiguous with the intermediate portion of the deep region, and having a third doping ion concentration,
   wherein the third doping ion concentration is greater than each of the first and second doping ion concentrations,
   wherein the deep region includes:
      a central region having a fourth doping ion concentration; and
      a peripheral zone surrounding the central region, the peripheral zone having a fifth doping ion concentration that is greater than the fourth doping ion concentration, the central region being spaced from the first layer portion, the second layer portion, and the third layer portion by the peripheral zone.

2. The opto-electronic device according to claim 1, wherein
   the deep region includes a solid cylindrical region, of doped silicon,
   the doped silicon selected from a group of silicon materials including monocrystalline silicon, polycrystalline silicon, and amorphous silicon, and
   the doped silicon has a substantially uniform doping ion concentration along the second direction.

3. The opto-electronic device according to claim 1, wherein
   the deep region includes a solid cylindrical region, of doped silicon selected from a group of silicon materials including monocrystalline silicon, polycrystalline silicon, and amorphous silicon.

4. The opto-electronic device according to claim 1, wherein the semiconductor layer includes a constant doping ion concentration portion that is the first and the second layer portions and a fourth layer portion, the fourth layer portion surrounding the third layer portion.

5. The opto-electronic device according to claim 1, wherein
   the semiconductor layer includes a first and a second surface, the deep region extends from the first surface of the semiconductor layer towards the second surface of the semiconductor layer, and
   the opto-electronic device further includes a base region adjacent to the second surface of the semiconductor layer, the base region having the first conductivity type and a sixth doping ion concentration, greater than the first and second doping ion concentrations.

6. The opto-electronic device according to claim 5, further comprising:
   a pillar extending throughout the thickness of the semiconductor layer, between the first and second surfaces, at a distance from the deep region, and in direct electrical contact with the base region.

7. A process, comprising:
   forming a semiconductor layer of a first conductivity type, the semiconductor layer having a thickness in a first direction; and
   forming at least one deep region of a second conductivity type in the semiconductor layer, the deep region forming a PN junction with the semiconductor layer, the deep region including a bottom portion, an intermediate portion and a surface portion,
   wherein the deep region has a depth along the first direction and a width in a second direction transverse to the first direction, the depth being greater than the width,
   wherein the semiconductor layer includes:
      a first layer portion contiguous with the bottom portion of the deep region, and having a first doping ion concentration;
      a second layer portion contiguous with the surface portion of the deep region, and having a second doping ion concentration; and
      a third layer portion contiguous with the intermediate portion of the deep region, and having a third doping ion concentration,
   wherein the third doping ion concentration is greater than each of the first and second doping ion concentrations,
   wherein forming of the semiconductor layer and the deep region includes:
      forming a first epitaxial sub-layer;
      selectively introducing, in the first epitaxial sub-layer, doping ionic species configured to confer the second conductivity type;
      forming, in the first epitaxial sub-layer, a first deep sub-region;

forming a subsequent epitaxial sub-layer on the first epitaxial sub-layer, the first epitaxial sub-layer and the subsequent epitaxial sub-layer having a constant doping level;

selectively introducing, in the subsequent epitaxial sub-layer and vertically aligned with the first deep sub-region, doping ionic species configured to confer the second conductivity type;

forming, in the subsequent epitaxial sub-layer, a subsequent deep sub-region superimposed on and contiguous with the first deep sub-region; and forming an increased doped region, of the first conductivity type, surrounding the deep region and forming the third layer portion.

8. The process according to claim 7, wherein forming the semiconductor layer includes:

forming a lower layer including the first layer portion;

forming an intermediate layer including the third layer portion and above the lower layer; and forming a surface layer including the second layer portion, the lower layer having the first doping ion concentration, the surface layer having the second doping ion concentration, and the intermediate layer having the third doping ion concentration.

9. The process according to claim 7, wherein forming the increased doped region includes forming a first increased doped sub-region by introducing doping ionic species into the subsequent epitaxial sub-layer, adjacent to the subsequent deep sub-region.

10. The process according to claim 7, wherein the semiconductor layer includes a first and a second surface, the deep region extends from the first surface of the semiconductor layer towards the second surface of the semiconductor layer, the process further including:

forming a base region adjacent to the second surface of the semiconductor layer, the base region having the first conductivity type and a fourth doping ion concentration, greater than the first and second doping ion concentrations; and forming a pillar extending throughout the thickness of the semiconductor layer, between the first and second surfaces, at a distance from the deep region, and in direct electrical contact with the base region.

11. A method, comprising:

forming a semiconductor layer on a substrate, the semiconductor layer having a first conductivity type, a first surface, and a second surface opposite to the first surface, the semiconductor layer including:

a first layer portion on the first surface of the substrate and having a first doping ion concentration;

a second layer portion on the first layer portion and having a second doping ion concentration; and a third layer portion on the second layer portion and having a third doping ion concentration, the second doping ion concentration is greater than each of the first doping ion concentration and the third doping ion concentration;

forming a trench in the semiconductor layer, the trench extending through the third layer portion, through the second layer portion, and into the first layer portion, a depth of the trench being greater than a width of the trench; and forming doped silicon in the trench, the doped silicon having a second conductivity type, the doped silicon including:

a central region having a fourth doping ion concentration; and a peripheral zone surrounding the central region, the peripheral zone having a fifth doping ion concentration that is greater than the fourth doping ion concentration, the central region being spaced from the first layer portion, the second layer portion, and the third layer portion by the peripheral zone.

12. The method of claim 11, wherein the substrate has the first conductivity type, and a sixth doping ion concentration greater than each of the first, second, and third doping ion concentrations.

13. The method of claim 11, further comprising:

forming an insulating layer on the semiconductor layer;

forming an opening in the insulating layer; and forming a contact in the opening and on the semiconductor layer.

14. The method of claim 11, wherein the doped silicon includes a material selected from a group of materials including monocrystalline silicon, polycrystalline silicon, and amorphous silicon.

15. The method of claim 11, wherein forming the doped silicon in the trench includes introducing doping ionic species configured to confer the second conductivity type in the semiconductor layer in proximity to a wall of the trench.

16. The method of claim 15, wherein introducing the doping ionic species includes carrying out a tilted implantation of the doping ionic species configured to confer the second conductivity type.

\* \* \* \* \*